(12) United States Patent
Herelier et al.

(10) Patent No.: US 10,486,294 B2
(45) Date of Patent: Nov. 26, 2019

(54) GAS-POWERED FIXING TOOL AND METHOD FOR OPERATING SAME

(71) Applicant: Illinois Tool Works Inc., Glenview, IL (US)

(72) Inventors: Patrick Herelier, Saint Jean de Muzols (FR); Pierre Cordeiro, Livron sur Drome (FR); Christian Ricordi, Chateauneuf-sur-Isere (FR)

(73) Assignee: Illinois Tool Works Inc., Glenview, IL (US)

( * ) Notice: Subject to any disclaimer, the term of this patent is extended or adjusted under 35 U.S.C. 154(b) by 291 days.

(21) Appl. No.: 15/346,120

(22) Filed: Nov. 8, 2016

(65) Prior Publication Data

US 2017/0203425 A1 Jul. 20, 2017

(30) Foreign Application Priority Data

Jan. 20, 2016 (FR) .................................. 16 50434

(51) Int. Cl.
*B25C 1/08* (2006.01)
*F02B 19/02* (2006.01)
(Continued)

(52) U.S. Cl.
CPC ............... *B25C 1/08* (2013.01); *F02B 19/02* (2013.01); *F02B 19/12* (2013.01); *F02B 63/02* (2013.01); *Y02T 10/125* (2013.01)

(58) Field of Classification Search
CPC .... F02B 19/00–18; F02B 19/12; F02B 63/00; F02B 63/02; F02B 71/04; B25C 1/08
(Continued)

(56) References Cited

U.S. PATENT DOCUMENTS

| 7,520,252 B2* | 4/2009 | Toulouse ................. B25C 1/08 123/46 A |
| 2001/0006045 A1* | 7/2001 | Thieleke .................. B25C 1/08 123/46 R |

(Continued)

FOREIGN PATENT DOCUMENTS

| DE | 19853555 | 5/2000 |
| EP | 1 093 888 | 4/2001 |
| FR | 2 799 677 | 4/2001 |

OTHER PUBLICATIONS

Australian Examination Report No. 1 for Australian Application No. 2016259395, dated May 11, 2017 (7 pages).
(Continued)

*Primary Examiner* — John M Zaleskas
(74) *Attorney, Agent, or Firm* — Neal, Gerber & Eisenberg LLP (57) ABSTRACT

Various embodiments of the present disclosure provide a gas-powered fixing tool including a working chamber, a piston slidably mounted in the working chamber, a precombustion chamber in which gas combustion is to be initiated, and a combustion chamber between the precombustion chamber and the working chamber. The precombustion and combustion chambers are separated by a flap that is movable between a position in which the precombustion and combustion chambers are in fluid communication and a position these chambers are not in fluid communication. The tool also comprises a combusted gas evacuation valve. The tool also comprises means for fluidic communication between the precombustion and combustion chambers. The means are configured to be activated after a start of displacement of the piston from a rest position to a working position, and before actuation of the valve for evacuation of combusted gas to the outside of the precombustion and/or combustion chamber.

20 Claims, 7 Drawing Sheets

(51) Int. Cl.
*F02B 19/12* (2006.01)
*F02B 63/02* (2006.01)

(58) Field of Classification Search
USPC ..... 123/46 H, 46 R, 46 SC, 253–293; 227/9, 227/10
See application file for complete search history.

(56) References Cited

U.S. PATENT DOCUMENTS

| | | | | |
|---|---|---|---|---|
| 2002/0134069 A1* | 9/2002 | Adams | ................... | B25C 1/08 60/39.6 |
| 2002/0134345 A1* | 9/2002 | Adams | ................... | B25C 1/08 123/285 |
| 2002/0144498 A1* | 10/2002 | Adams | ................... | B25C 1/08 60/39.6 |
| 2004/0144357 A1* | 7/2004 | Adams | ................. | F02B 19/02 123/260 |
| 2006/0226193 A1* | 10/2006 | Toulouse | ............... | B25C 1/08 227/10 |
| 2008/0237295 A1* | 10/2008 | Adams | ................... | B25C 1/08 227/130 |
| 2009/0025673 A1* | 1/2009 | Adams | ................... | B25C 1/08 123/190.4 |
| 2009/0159050 A1* | 6/2009 | Adams | ................ | F02M 21/047 123/46 SC |
| 2010/0108734 A1* | 5/2010 | Adams | ................... | B25C 1/08 227/9 |
| 2011/0005502 A1* | 1/2011 | Adams | ................... | B25C 1/08 123/559.1 |
| 2012/0210974 A1* | 8/2012 | Adams | ................. | B23Q 5/033 123/253 |
| 2015/0369118 A1* | 12/2015 | Adams | ................. | F02B 19/02 123/274 |

OTHER PUBLICATIONS

International Search Report and Written Opinion for French Application No. 1650434, dated Jul. 27, 2016 (9 pages).

* cited by examiner

GAS-POWERED FIXING TOOL AND METHOD FOR OPERATING SAME

PRIORITY CLAIM

This application claims priority to and the benefit of French Patent Application 1650434, which was filed on Jan. 20, 2016.

BACKGROUND

The present disclosure relates to a gas-powered fixing tool, such as a nail gun for example, and to the method of operation of same.

The present disclosure relates to anchoring or fixing tools, said to be gas-powered, which means to say tools comprising an internal combustion engine which works by igniting an air-fuel mixture inside a combustion chamber, the fuel being injected into the chamber by an injection device from a fuel receptacle referred to as a gas cartridge. Such tools are intended to drive fixing elements into supporting materials so that components can be fixed thereto. Gas-powered nail guns are very commonplace these days. As examples of fuels for the internal combustion engine, mention may be made of gasoline, alcohol, in liquid and/or gas form.

In general, such a tool is portable and comprises a casing in which the internal combustion engine that propels a piston that drives a fixing element is mounted. Such a tool may also comprise an electric battery as well as a holding, handling and firing handgrip on which a trigger by means of which the tool is actuated is mounted.

A firing cycle comprises several steps such as the distribution of a quantity of fuel by the cartridge, the admission of the fuel into the chamber, the mixing of the fuel with air in the chamber, the ignition and combustion of the mixture in order to drive the piston, and the evacuation of the combustion gases from the chamber.

The fixing tools equipped with two combustion chambers, namely a precombustion chamber and a combustion chamber are known. This type of tool in practice comprises three chambers because the tool comprises a third chamber, which will be referred to as a working chamber, in which a piston is slidably mounted for driving fixing elements. The combustion of the air-fuel mixture is intended to be initiated in the precombustion chamber, prior to the injection of this mixture into the combustion chamber in order to complete the combustion of the mixture. The precombustion and combustion chambers are separated from one another by a flap which is movable or deformable from a position in which it ensures fluidic communication between the precombustion and combustion chambers, and a position in which it isolates these chambers from each other, preferably hermetically. The tool in general also comprises gas intake and evacuation valves.

In the current art, the firing cycle or method of operation of a tool of this type comprises the following steps:
a) ignition of the gas in the precombustion chamber, causing an increase in pressure in the precombustion chamber,
b) displacement or deformation of said flap because of the increase in pressure in the precombustion chamber above a certain threshold, and passage of the gas into the combustion chamber,
c) combustion of said gas in the combustion chamber, causing an increase in pressure in the combustion chamber,
d) displacement of said piston from a rest position to a working position because of the increase in pressure in the combustion chamber,
e) reverse displacement of said piston from the working position because of a reduced pressure in the combustion chamber, and
f) evacuation of combusted gas from the precombustion chamber and/or the combustion chamber via said valve.

The present disclosure proposes an improvement to this technology notably making it possible to shorten the duration of a firing cycle.

SUMMARY

The present disclosure thus proposes a method for operation of a gas-powered fixing tool, said tool comprising a working chamber in which a piston is slidably mounted for driving a fixing element, a precombustion chamber in which the combustion of a gas is intended to be initiated, and a combustion chamber arranged between the precombustion chamber and the working chamber, said precombustion and combustion chambers being separated from each other by a flap which is movable or deformable from a position in which it ensures fluidic communication between said precombustion and combustion chambers and a position in which it isolates these chambers from each other, the tool also comprising at least one combusted gas evacuation valve, the method comprising the following steps:
a) ignition of the gas in the precombustion chamber, causing an increase in pressure in the precombustion chamber,
b) displacement or deformation of said flap because of the increase in pressure in the precombustion chamber above a certain threshold, and passage of the gas into the combustion chamber,
c) combustion of said gas in the combustion chamber, causing an increase in pressure in the combustion chamber,
d) displacement of said piston from a rest position to a working position because of the increase in pressure in the combustion chamber,
e) reverse displacement of said piston from the working position because of a reduced pressure in the combustion chamber, and
f) evacuation of combusted gas from the precombustion chamber and/or the combustion chamber via said valve, characterized in that it comprises, between steps d) and f) or e) and f), an additional step of:
z) establishment of fluidic communication between said precombustion and combustion chambers, such that a reduced pressure in the precombustion chamber participates in and accelerates the reverse displacement of said piston from the working position to the rest position.

The present disclosure thus proposes to benefit from the combined volumes of the precombustion and combustion chambers and therefore of the reduced pressures or suctions in these volumes in order to accelerate the return of the piston to its rest position, with no loss of working power. That makes it possible to reduce the duration of a firing cycle of the tool, which can thus be used a greater number of times over a given period of time.

The method according to the present disclosure may comprise one or more of the following features or steps, considered in isolation from one another or in combination with one another:

said establishment of fluidic communication in step z) is deactivated or does not take place in step a), c) and/or d), said establishment of fluidic communication of step z) is activated or takes place only between steps d) and f) or e) and f), said establishment of fluidic communication of step z) begins or is activated in step d) or e), or just after step d) or e), said establishment of fluidic communication of step z) is terminated or deactivated before step f), said establishment of fluidic communication of step z) is controlled pneumatically or mechanically, the reduced pressure in step e) is at least partially obtained by exhausting combustion gas through an exhaust orifice of said working chamber.

The present disclosure also relates to a gas-powered fixing tool, comprising a working chamber in which a piston is slidably mounted for driving a fixing element, a precombustion chamber in which the combustion of a gas is intended to be initiated, and a combustion chamber arranged between the precombustion chamber and the working chamber, said precombustion and combustion chambers being separated from each other by a flap which is movable or deformable from a position in which it ensures fluidic communication between said precombustion and combustion chambers and a position in which it isolates these chambers from each other, the tool also comprising at least one combusted gas evacuation valve, characterized in that it comprises means for fluidic communication between said precombustion and combustion chambers, which means are configured to be activated after a start of displacement of the piston from a rest position to a working position, and before actuation of said valve for evacuation of combusted gas to the outside of the precombustion and/or combustion chamber.

The tool according to the present disclosure may comprise one or more of the following steps or features, considered in isolation from one another or in combination with one another:

said fluidic communication means are independent of said flap, said fluidic communication means are configured to be deactivated on ignition and/or combustion of gas in the precombustion and/or combustion chamber, said fluidic communication means are configured to be activated only after the start of displacement of the piston and before actuation of said evacuation valve, said fluidic communication means are configured to be controlled pneumatically or mechanically, said fluidic communication means comprise at least one conduit formed in a housing of the precombustion chamber and/or the combustion chamber, said fluidic communication means comprise at least one conduit formed in a support body for said flap, said support has an elongated form and is connected by at least one of its longitudinal ends to a mobile body of a valve, such as said evacuation valve, said support is connected by each of its longitudinal ends to a mobile body of a valve, being said evacuation valve and a gas inlet valve, said fluidic communication means comprise at least one valve which is movable or displaceable between a first position of sealing said at least one conduit, and a second position of opening said at least one conduit, said valve is stressed by an elastic return means in its first position, said valve comprises a ring arranged close to said flap and stressed against the flap by said return means, said valve is formed of one piece with said flap or fixed to said flap, said valve is secured to a mobile body of said evacuation valve, and the valve has a cylindrical tubular overall shape and comprises a substantially radial through-orifice able to be placed in fluidic communication with said conduit.

BRIEF DESCRIPTION OF THE DRAWINGS

The present disclosure will be better understood and further details, features and advantages of the present disclosure will become more clearly apparent from reading the description which follows, given by way of nonlimiting example and by referring to the attached drawings.

DETAILED DESCRIPTION

FIGS. 1a to 1f illustrate the prior art to the present disclosure.

The fixing tool 10 is partially depicted in the drawings. This tool comprises a casing 12 in which there is an internal combustion engine equipped with three chambers: a combustion chamber 14, a precombustion chamber 16 and a working chamber 18.

The precombustion chamber 16 and combustion chamber 14 receive a mixture of air and fuel ignition of which causes a piston 20 to be propelled in the working chamber 18, the piston being intended to drive a fixing element 22 taken from a feed magazine, which is intended to be anchored in a support material, at the outlet of a nail guide 24 extending at the front of the casing 12. Although this cannot be seen, the casing 12 of the tool comprises a handgrip for holding and handling the tool. The grip is also used for firing, using an actuating trigger mounted thereon. All of these components of gas-powered fixing tools are known to those skilled in the art and have therefore not all been depicted in the drawings.

The supply of fuel to the precombustion chamber 16 and combustion chamber 14 of the motor is effected via an injection member, from a fuel gas cartridge.

In practice, the precombustion chamber 16 receives an air-fuel mixture, ignition of which is brought about in the precombustion chamber by a spark plug or the like. The flame produced therefore enters the combustion chamber 14 and combustion of the mixture continues in the combustion chamber, the explosion of the mixture in this chamber causing the piston 20 to move in the chamber 18, and therefore causing the fixing element 22 to be driven.

In the example depicted, the precombustion chamber 16 has an elongate shape and comprises a longitudinal end, in this instance an upper end, connected to a lower, longitudinal end of the combustion chamber 14 which is likewise of elongate shape. The axes of elongation of the chambers are substantially parallel or even coincident.

The lower end of the precombustion chamber 16 is equipped with an intake valve 26 for the fuel gas delivered by the cartridge. The combustion chamber 14 communicates with an end, in this instance rear end, of the working chamber 18 and is equipped at its upper end with a combusted gas evacuation valve 28. It is via this front end of the working chamber 18 that the fixing element 22 is propelled.

The precombustion chamber 16 has a volume V1 and the combustion chamber 14 has a volume V2.

The working chamber 18 also has an elongate shape with the axis of elongation substantially perpendicular to the precombustion 16 and combustion 14 chambers. The chamber 18 is equipped with an exhaust orifice 29.

Each of the valves 26, 28 comprises a mobile body 26a, 28a which is movable between a position in which an orifice 26b, 28b is open and a position in which the orifice is closed.

The mobile bodies 26a, 26b of the valves 26, 28 are connected respectively to the longitudinal ends of a cylindrical rod 30 of longitudinal axis X. This rod 30 has a diameter smaller than the inside diameter of the case 32 defining the chambers 14, 16 and here in cross section (perpendicular to the axis X) having a circular shape. The diameter of the rod 30 is preferably comprised between 0.1 and 0.3 times the internal diameter of the case, and is, for example, 0.15-0.16 times the internal diameter of the case.

Figures 1A, 1B:
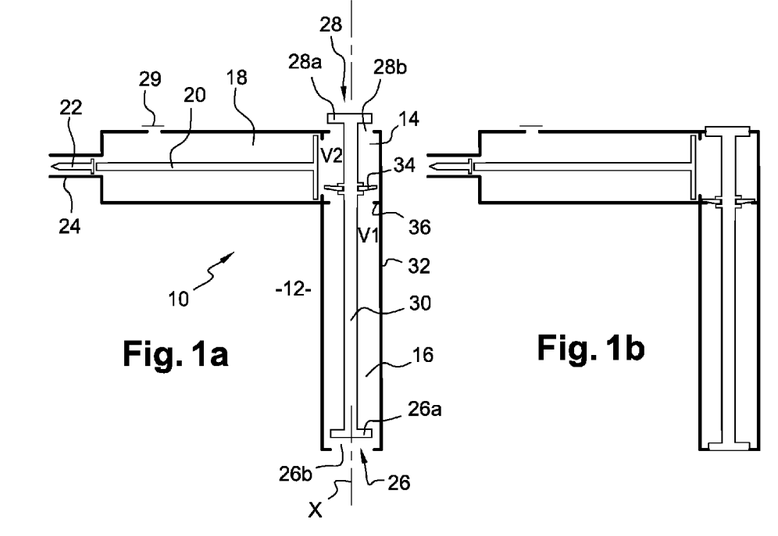
FIGS. 1a to 1f are highly schematic partial sectional views of a gas-powered fixing tool according to the prior art, and illustrate steps in the method of operation of same.

The rod 30 bears a flap 34 which is movable along the axis X between a first position in which it seals closed an orifice providing fluidic communication between the precombustion 16 and combustion 14 chambers, and therefore isolates these chambers (FIG. 1b) and a position in which the communicating orifice is open, and in which there is therefore fluidic communication between the precombustion and combustion chambers (FIG. 1a). The flap 34 is situated some distance from the longitudinal ends of the rod 30.

The flap 34 comprises, for example, a disk through which the rod 30 passes and secured thereto. The disk is intended to collaborate with an annular seat 36 of the case 32. FIG. 1a illustrates the flap 34 in the open position, the disk being situated away from its seat 36. In the closed position, the disk collaborates in a sealing manner with the seat 36 (FIG. 1b). The seat 36 defines an orifice for the passage of gas from the precombustion chamber 16 toward the combustion chamber 14.

The mobile body 26a, 28a of each valve 26, 28 may comprise a disk or piston which at its external periphery bears a seal intended to collaborate with an internal cylindrical surface of the corresponding orifice 26a, 28b. In this particular instance, the orifice 26b is a fuel intake orifice and the orifice 28b is a combusted gas evacuation orifice.

Figure 1C:
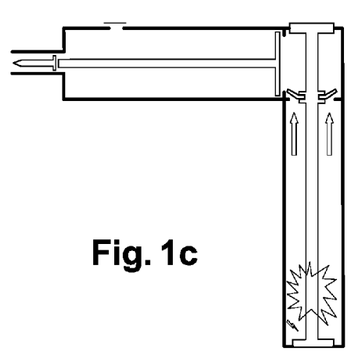
Figure 1D:
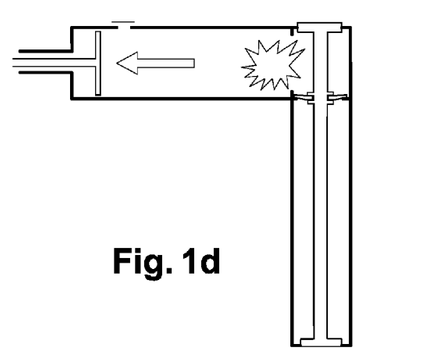
Figure 1E:
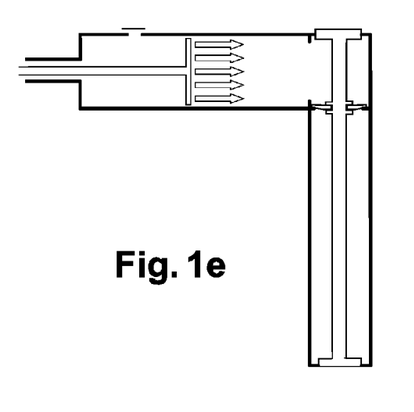

The fixing tool 10 works as follows. In general, the placing of one end of the tool on the support material into which a fixing element 22 is to be affixed allows a quantity of fuel to be released from the cartridge, this fuel being conveyed from the cartridge to the intake orifice 26b. The fuel enters the precombustion chamber 16 because of the opening of the valve 26 (movable body 26a in the raised or open position—FIG. 1a). The user generally has a few seconds to spare before the fuel is diffused into the atmosphere, and in which to actuate the trigger of the tool. When the trigger is actuated, the chambers 14, 16 are isolated (FIG. 1b) and a spark is generated in the chamber 16 via the spark plug. This spark brings about precombustion of the air-fuel mixture in the chamber 16, which causes an increase in pressure in the chamber 16. When this pressure overtakes a certain threshold, the flap 34 opens and allows the mixture to pass into the combustion chamber 14, the pressure in which increases (FIG. 1c). Shortly afterward, the flame passes in turn through the flap 34 and ignites the combustion chamber 14 and causes the piston 20 to move and a fixing element 22 to be expelled into the support material (FIG. 1d). Shortly before reaching its deployed or working position, the piston 20 reaches and overtakes the exhaust orifice 29. Some of the combusted gases situated behind the piston escape via this orifice 29, lowering the pressure in the working chamber and discharging some of the hot gases. This exhausting generates a reduced pressure in the combustion chamber and has a tendency to return the piston to its initial rest position (FIG. 1e). After the piston has returned to its rest position (FIG. 1f), the valve 28 opens to expel the combustion gases through the evacuation orifice 28b.

Figure 1F:
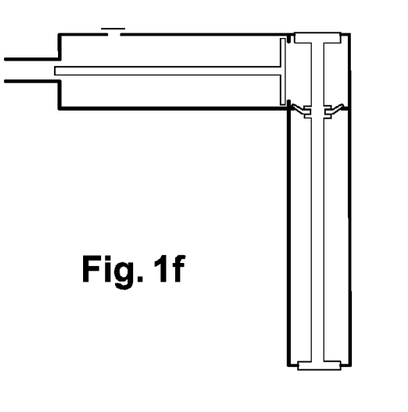
Figure 2:
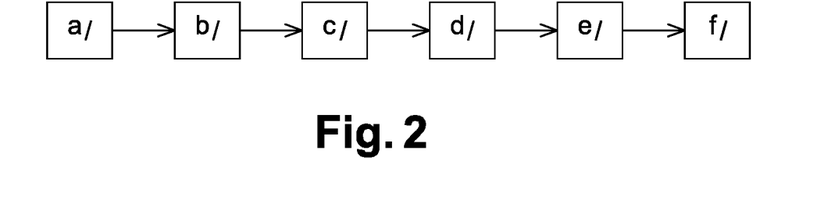
FIG. 2 is a flow diagram showing steps of a method according to the prior art for operating a gas-powered fixing tool.

FIG. 2 is a block diagram depicting the steps of the method of operation, or firing cycle, of the gas-powered fixing tool described in the foregoing. The method on the whole comprises six steps a) to f), which are:

a) ignition of the gas in the precombustion chamber, causing an increase in pressure in the precombustion chamber (FIG. 1c), b) displacement or deformation of the flap because of the increase in pressure in the precombustion chamber above a certain threshold, and passage of the gas into the combustion chamber (FIG. 1c), c) combustion of the gas in the combustion chamber, causing an increase in pressure in the combustion chamber (FIG. 1d), d) displacement of the piston from the rest position to the working position because of the increase in pressure in the combustion chamber (FIG. 1d), e) reverse displacement of the piston from the working position because of a reduced pressure in the combustion chamber (FIG. 1e), and f) evacuation of combusted gas from the precombustion chamber and/or the combustion chamber via the evacuation valve (FIGS. 1f and 1a).

FIGS. 4a to 4f illustrate a first embodiment of the present disclosure in which the foregoing description relating to the prior art remains applicable. In order to accelerate the return of the piston 20 toward its rest position, the present disclosure provides, between steps d) and f) or e) and f), an additional step z) of establishment of fluidic communication between the precombustion 16 and combustion 14 chambers such that a reduced pressure in the precombustion chamber participates in and accelerates reverse displacement of the piston from the working position to the rest position.

Figure 3A:
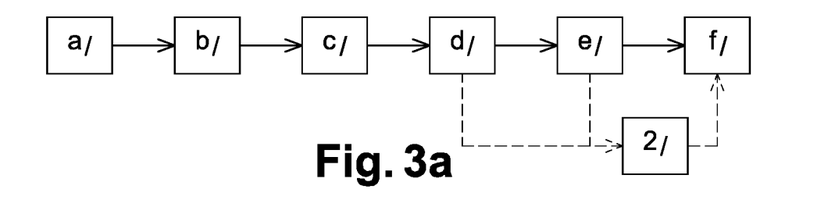
FIGS. 3a to 3c are flow diagrams showing alternative forms of a method according to the present disclosure for operating a gas-powered fixing tool.
Figure 3B:
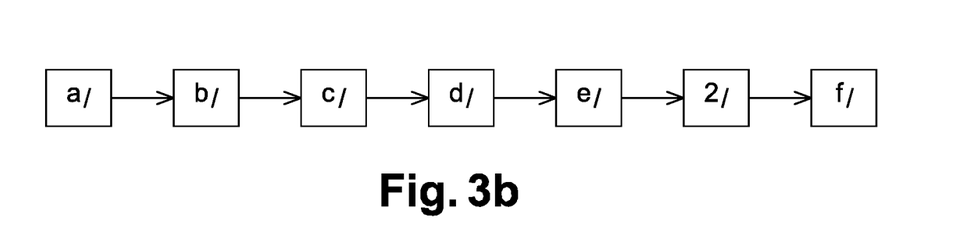
Figure 3C:
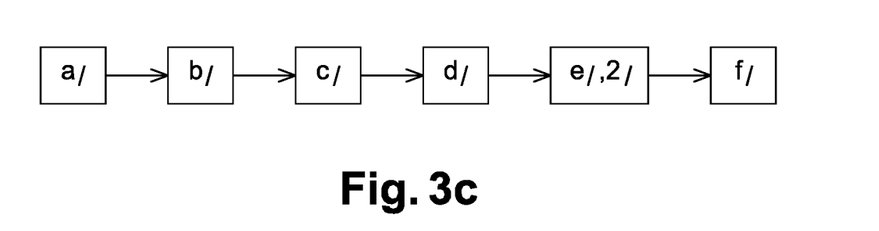

Step z) may begin at step d) or just after (FIG. 3a), during step e) (FIG. 3c) or just after same (FIG. 3b). It takes place before step f) and may be terminated just before step f). For preference, step z) does not take place in step a), c) and/or d).

In the exemplary embodiment of FIGS. 4a to 4f, the means of establishment of fluidic communication between the precombustion 16 and combustion 14 chambers of the tool 110 are configured to be activated after a start of displacement of the piston 20 from the rest position to the working position and before actuation of the valve 28 for evacuating combusted gases to outside the chambers 14, 16.

Figure 4A:
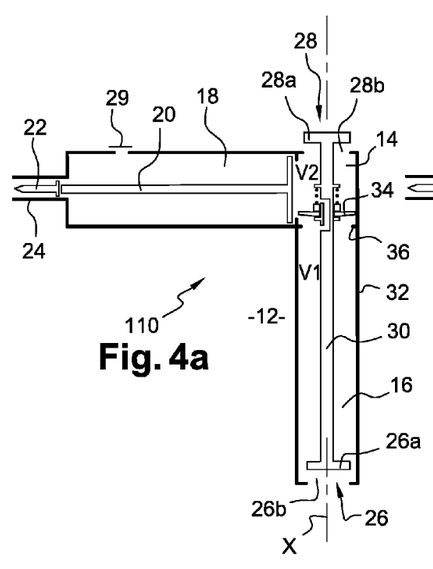
FIGS. 4a to 4f are highly schematic partial sectional views of one embodiment of a gas-powered fixing tool according to the present disclosure, and illustrate steps in the method of operation of same.
Figure 4B:
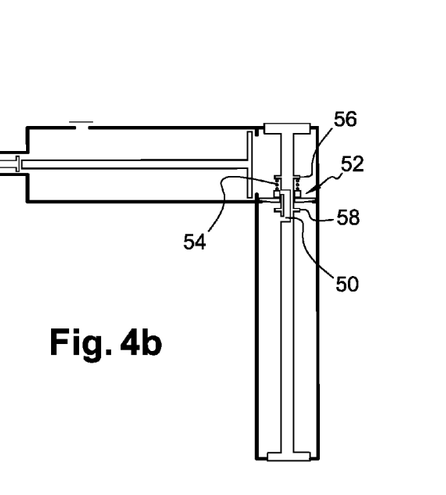
Figure 4C:
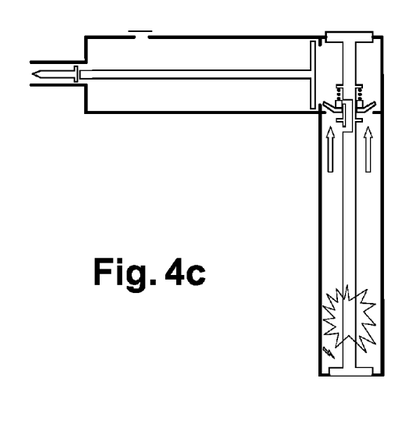
Figure 4D:
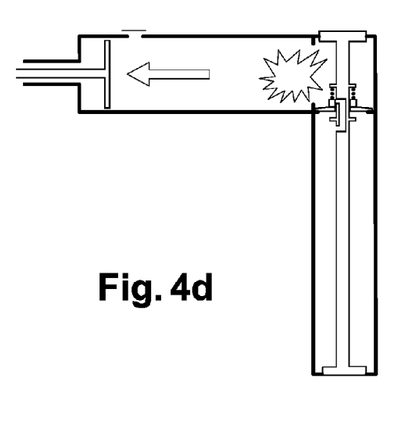
Figure 4E:
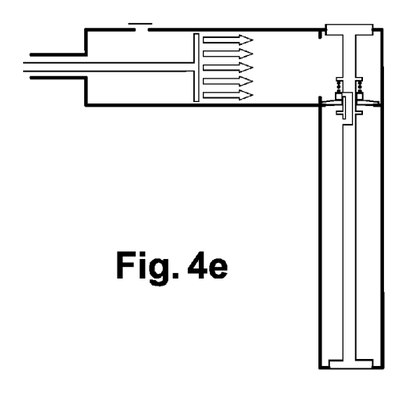
Figure 4F:
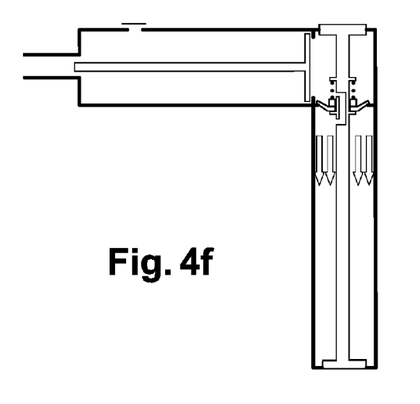

The fluidic communication means here comprise at least one conduit 50 and at least one valve 52 that is movable or displaceable between a first position of sealing of the conduit (FIGS. 4b-4e) and a second position of opening of the conduit (FIGS. 4a and 4f).

In the case of FIGS. 4a to 4f, the conduit 50 is formed in the rod 30. It is substantially U-shaped and comprises a middle portion of elongate shape extending substantially on the inside of the rod 30 along the axis X. This middle portion is connected to an upper end portion which is able to communicate with the combustion chamber 14, and a lower end portion which is able to communicate with the precombustion chamber 16. The portions of the conduit are substantially coplanar. The flap 34, particularly the disk part thereof, is situated in a plane substantially perpendicular to the plane of the conduit 50 and passing substantially through the middle of the conduit.

The valve 52 here has an annular shape and has the rod 30 passing through it. It is independent of the flap 34 and urged against the end or upper face thereof by an elastic return means 54 mounted between the valve 52 and an external annular rim 56 of the rod (situated at the level of the combustion chamber 14). The return means 54 here is a compression spring.

In the example depicted, the flap 34 is also mounted with the ability to move along the axis X on the rod 30 and is urged by the return means 54 against another external annular rim 58 of the rod, which may be situated at the level of one of the chambers 14, 16. The upper portion of the conduit opens between the rims 56, 58 and its lower portion opens under the rim 58.

As an alternative, the valve 52 is formed of one piece with the flap or fixed to the flap.

The valve 52 is slidably movable along the rod 30, which means to say along the axis X, between a first rest position, here an upper position, in which it is situated facing the upper end portion of the conduit 50 and closes the latter, thus preventing gas from passing along the conduit, and a second position, in this instance a lower position, in which it is axially offset from the upper end portion of the conduit, in this instance downward, the conduit therefore providing fluidic communication between the precombustion chamber 16 and the combustion chamber 14.

The means of fluidic communication are considered here to be controlled pneumatically, particularly by the pressure prevailing in the combustion chamber 14. The valve 52 is configured to be in its rest (upper) position during steps of igniting and combusting gas in the precombustion 16 and combustion 14 chambers (FIGS. 4c and 4d). The establishment of fluidic communication between the chambers 14, 16 by the conduit 50 is therefore deactivated. The only fluidic communication to take place is that obtained as a result of the opening of the flap 30 (FIG. 4c).

The valve 52 is also configured to be moved from its rest position into its lowered position during the displacement of the piston 20 or only after the start of displacement of the piston 20, and before the evacuation valve 28 is actuated. The establishment of communication between the chambers 14, 16 via the conduit 50 is therefore activated here.

Activation for establishment of communication between chambers 14, 16, namely displacement of the valve 52, is the result of a difference in pressure between the chambers 14, 16 (the pressure in the combustion chamber 14 being higher than the pressure in the precombustion chamber 16 in which a decrease in pressure has therefore occurred), which is above a certain threshold and is applied for sufficient duration to cause this displacement. In practice, such a pressure difference occurs on two occasions during the firing cycle: at the moment at which the explosion occurs in the combustion chamber 14 (FIG. 4d) and at the moment at which the piston returns from its working position to its rest position (FIG. 4e), or is on the point of setting back out in its rest position. In both instances, the conditions in terms of pressure are sufficient to cause the displacement of the valve 52. However, the explosion rate in the first instance (FIG. 4d) is very high which means that the difference in pressure at this stage is not applied for a long enough period of time to allow the valve 52 to move. The duration of the explosion is, in general, a few milliseconds. By contrast, the duration for which the piston 20 is returning to its rest position (FIG. 4e) may be several tens of milliseconds, which is long enough to allow the valve 52 to move as a result of the aforementioned difference in pressure. This is how the characteristics of the valve 52 can be determined so that the establishment of fluidic communication between the chambers 14, 16 occurs only during certain steps of a firing cycle rather than in all the steps, such as the step in which the flame passes from the precombustion chamber 16 to the combustion chamber 14 (FIG. 4c).

In the alternative form of embodiment of FIGS. 5a to 5f, the means of establishing fluidic communication between the chambers 14, 16 of the tool 210 are also configured to be activated after the piston 20 starts to move from the rest position to the working position and before the valve 28 is actuated to evacuate the burnt gas to outside the chambers.

Figure 5A:
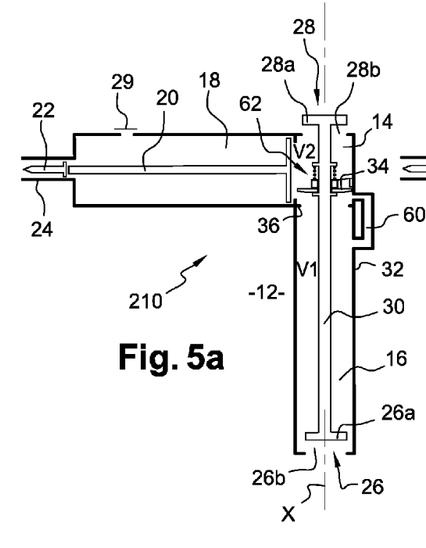
FIGS. 5a to 5f are highly schematic partial sectional views of an alternative form of embodiment of a gas-powered fixing tool according to the present disclosure and illustrate steps in the method of operation of same.
Figure 5B:
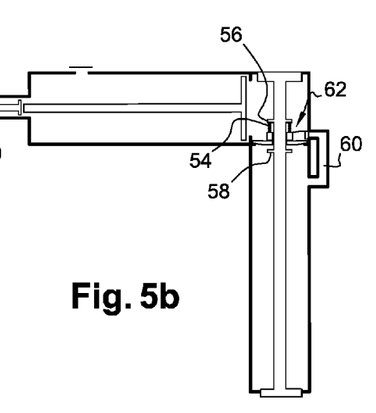
Figure 5C:
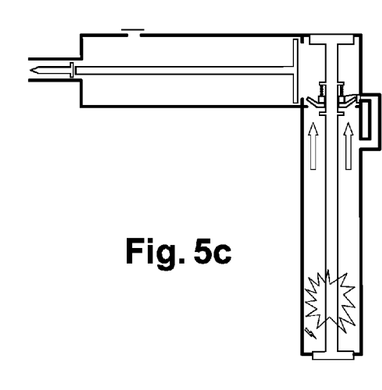
Figure 5D:
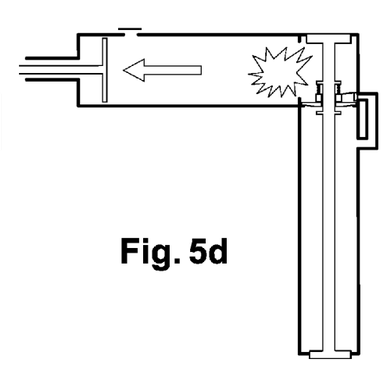
Figure 5E:
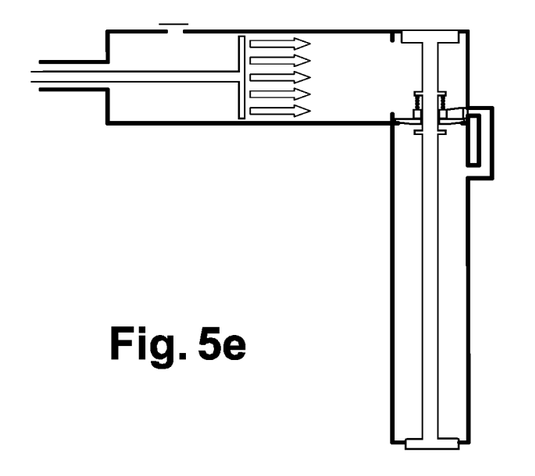
Figure 5F:
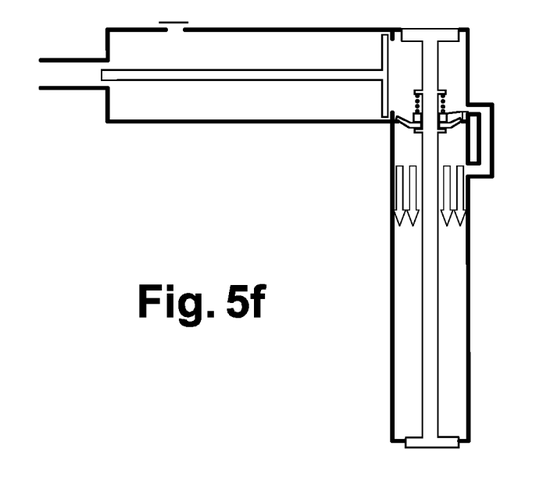

The means of fluidic communication here comprise at least one conduit 60 and at least one valve 62 which is movable or displaceable between a first position of sealing of the conduit (FIGS. 5b-5e) and a second position of opening of the conduit (FIGS. 5a and 5f).

In the case of FIGS. 5a to 5f, the conduit 60 is formed in the case 32 of the chambers 14, 16. It is substantially U-shaped and comprises a middle portion of elongate shape extending substantially along one side of the chambers, along the axis X. This middle portion is connected to an upper end portion which is able to communicate with the combustion chamber 14, and a lower end portion which is able to communicate with the precombustion chamber 16. The conduit portions are substantially coplanar. The flap 34, particularly the disk portion thereof, is situated in a plane substantially perpendicular to the plane of the conduit and passing substantially level with the conduit.

The valve 62 here is of annular shape and has the rod 30 passing through it. It is independent of the flap 34 and urged against the end or upper face thereof by an elastic return means 54 mounted between the valve 62 and an external annular rim 56 of the rod (situated at the level of the combustion chamber 14). The return means here is a compression spring.

In the example depicted, the flap 34 is also mounted with the ability to move along the axis X on the rod 30 and is urged by the return means 54 against another external annular rim 58 of the rod, which may be situated at the level of one of the chambers 14, 16. The upper portion of the conduit opens between the rims 56, 58 and its lower portion opens under the rim 58.

As an alternative, the valve 62 may be formed of one piece with the flap 34 or fixed to the flap. Here it has a particular shape because it comprises a transverse tab oriented substantially radially with respect to the axis X and the radially external free end of which collaborates in sliding with the (for example cylindrical) internal surface of the case 32.

The valve 62 is slidably movable along the rod 30, which means to say along the axis X, between a first, in this instance upper, rest position, in which it is situated facing the upper end portion of the conduit 60 and seals same, thus preventing gas from passing through the conduit, and a second position, in this instance a lower position, in which it is axially offset from the upper end portion of the conduit, in this instance downward, the conduit 60 therefore providing fluidic communication between the precombustion chamber 16 and the combustion chamber 14.

The means of establishing fluidic communication are configured here to be controlled pneumatically, particularly by the pressure prevailing in the combustion chamber 14. The valve 62 is configured to be in its (upper) rest position during the steps of ignition and combustion of gas in the precombustion 16 and combustion 14 chambers (FIGS. 5*c* and 5*d*). The establishment of fluidic communication between the chambers 14, 16 by the conduit 60 is therefore deactivated. The only fluidic communication to take place is that obtained as a result of the opening of the flap 30 (FIG. 5*c*).

The valve 62 is also configured to be moved from its rest position to its lower position during the displacement of the piston 20 or only after the start of displacement of the piston 20, and prior to actuation of the evacuation valve 28. Establishment of communication between chambers 14, 16 via the conduit 60 is therefore activated here.

The operating of the fluidic communication means (conduit 60 and valve 62) is similar to that of the communication means (conduit 50 and valve 52) of the previous embodiment described in the foregoing.

Figure 6A:
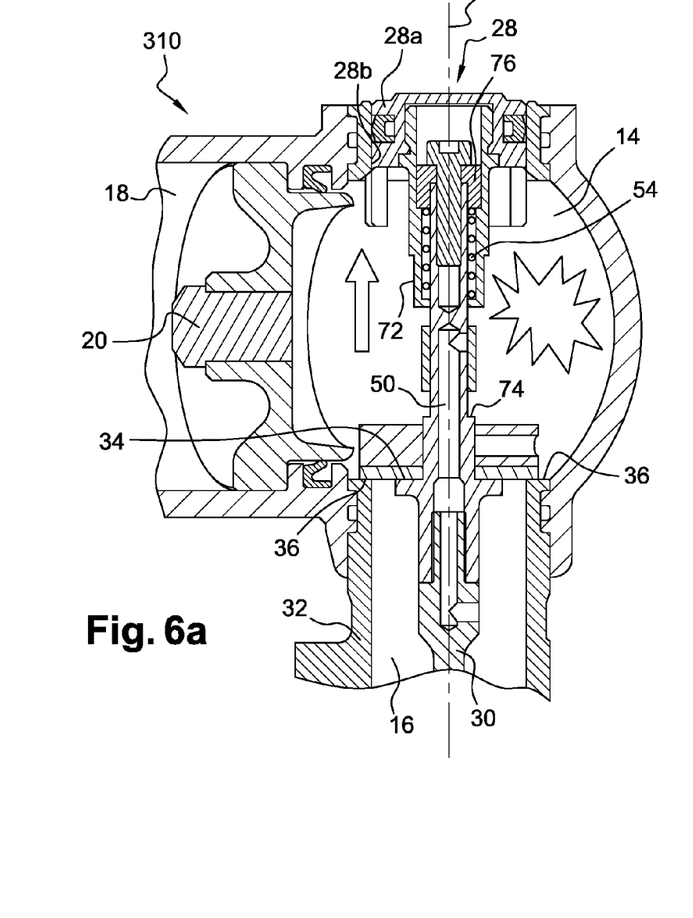
FIGS. 6a and 6b are schematic partial sectional views of another alternative form of embodiment of a gas-powered fixing tool according to the present disclosure and illustrate steps in the method of operation of same.
Figure 6B:
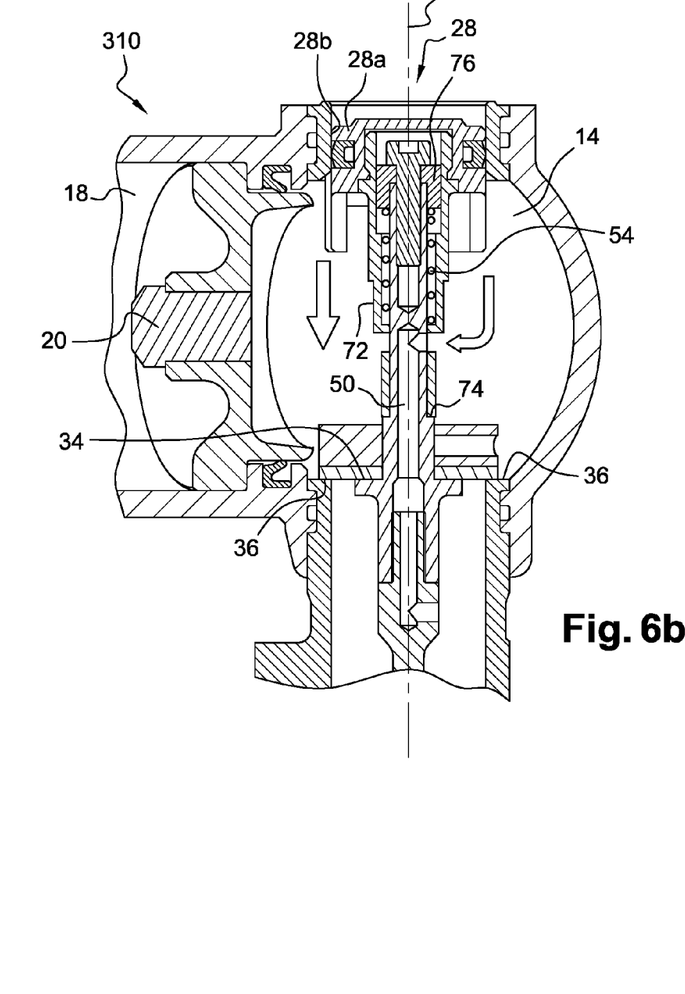

FIGS. 6*a* and 6*b* illustrate a more concrete example of an alternative form of embodiment of the tool 310 according to the present disclosure. This tool 310 comprises the same features as the tools 10, 110 described above, in so far as these do not contradict what follows.

The references used hereinabove to describe the features of the tools 10, 110 are reused in FIGS. 6*a*, 6*b* to denote the same features of the tool 310.

The means of establishing fluidic communication between the precombustion chamber 16 and combustion chamber 14 of the tool 310 are configured to be activated after the piston 20 begins to move from the rest position to the working position and before the valve 28 is actuated to evacuate the combusted gases to outside the chambers 14, 16.

The means of establishing fluidic communication here comprise at least one conduit 50 and at least one valve 72 movable or displaceable between a first position of sealing the conduit (FIG. 6*a*) and a second position of opening the conduit (FIG. 6*b*).

As with the tool 110, the conduit 50 is formed in the rod 30. It is substantially U-shaped and comprises a middle portion of elongate shape extending substantially along the inside of the rod 30 along the axis X. This middle portion is connected to an upper end portion which is able to communicate with the combustion chamber 14, and a lower end portion which is able to communicate with the precombustion chamber 16. The conduit portions are substantially coplanar.

The valve 72 here has a cylindrical and tubular overall annular shape and is mounted coaxially around the rod 30, at the level of the upper end thereof. The valve 72 is essentially housed in the combustion chamber 14. In the example depicted, it is independent of the flap 34 and secured to the mobile body 28*a* of the valve 28.

The valve 72 comprises axial stop means, with respect to the axis X, intended to collaborate with complementary means of the rod 30 to limit its travel along the axis X and define the aforementioned positions of the valve. First stop means are formed by the lower free end of the valve 72, which is intended to collaborate with a cylindrical bearing surface 74 of the rod, in this instance situated just above the flap 34. Second stop means are formed by an internal cylindrical bearing surface of the valve 72 which is intended to collaborate with a ring 76 attached and fixed to the upper end of the rod 30. The first means collaborate with the bearing surface 74 to define the aforementioned opening position (FIG. 6*b*) and the second means collaborate with the ring 76 to define the aforementioned second sealing position (FIG. 6*a*).

An elastic return means 54 is mounted between the valve 52 and the ring 76 and allows the valve to be urged into its first position. The return means 54 here is a compression spring.

The flap 34 and particularly the disk portion thereof, is situated in a plane substantially perpendicular to the plane of the conduit 50 and passing substantially through the middle of the conduit. In the example depicted, the flap 34 may be fixed along the axis X to the rod 30 and is intended to collaborate with an annular seat 36 of the case 32.

The mobile body 28*a* of the valve 28 here comprises a piston which at its external periphery bears a seal intended to collaborate with an internal cylindrical surface of the orifice 28*b*. The piston surrounds the upper end of the valve and may be fixed thereto by screwing, as in the example depicted.

The operation of the means of establishing fluidic communication (conduit 50 and valve 72) are similar to that of the means of establishing communication (conduit 50 and valve 52) described in the foregoing.

In an alternative form of embodiment that has not been depicted, the means of establishing communication could be activatable mechanically, for example using a lever actuated as the piston rises.

The invention claimed is:

1. A method of operating a gas-powered tool, the method comprising:
   (a) igniting gas in a precombustion chamber of the tool, thereby causing a pressure within the precombustion chamber to increase;
   (b) moving or deforming a flap that separates the precombustion chamber and a combustion chamber responsive to the pressure within the precombustion chamber exceeding a threshold, thereby establishing fluid communication between the precombustion chamber and the combustion chamber and causing the gas to flow into the combustion chamber;
   (c) combusting the gas in the combustion chamber, thereby causing a pressure in the combustion chamber to increase and causing the fluid communication between the precombustion chamber and the combustion chamber to cease;
   (d) moving a piston in a working chamber from a rest position to a working position responsive to the increase in the pressure in the combustion chamber;
   (e) moving the piston from the working position because of a reduced pressure in the combustion chamber;
   (f) evacuating combusted gas from the combustion chamber via an evacuation valve;

(g) reestablishing fluid communication between the precombustion and combustion chambers after (d) and prior to (f) or after (e) and prior to (f); and (h) terminating the reestablished fluid communication between the precombustion and combustion chambers prior to step (f), such that a reduced pressure in the precombustion chamber accelerates the displacement of the piston from the working position to the rest position.

2. The method of claim 1, wherein reestablishing fluid communication between the precombustion and combustion chambers does not take place in any of steps (a), (c) and (d).

3. The method of claim 1, wherein reestablishing fluid communication between the precombustion and combustion chambers takes place only between steps (d) and (f) or (e) and (f).

4. The method of claim 1, wherein reestablishing fluid communication between the precombustion and combustion chambers begins in step (d) or (e) or just after step (d) or (e).

5. A gas-powered tool comprising:
a working chamber;
a piston slidably mounted in the working chamber;
a precombustion chamber;
a combustion chamber spaced apart from the precombustion chamber and the working chamber, and positioned between the precombustion chamber and the working chamber;
a flap separating the precombustion and combustion chambers, the flap being movable or deformable between a first position in which the precombustion and combustion chambers are in fluid communication and a second position in which the precombustion and combustion chambers are not in fluid communication;
at least one combusted gas evacuation valve including an orifice defined by a wall of the combustion chamber, the at least one combusted gas evacuation valve configured to evacuate combusted gas from the combustion chamber; and
a fluidic communication device configured to establish fluid communication between the precombustion and combustion chambers and configured to be activated after the piston begins moving from a rest position to a working position and before actuation of the combusted gas evacuation valve to evacuate combusted gas from the combustion chamber.

6. The gas-powered tool of claim 5, wherein the fluidic communication device is operable independent of the flap.

7. The gas-powered tool of claim 5, wherein the fluidic communication device is configured to be deactivated on ignition and/or combustion of gas in the precombustion chamber and/or the combustion chamber.

8. The gas-powered tool of claim 5, wherein the fluidic communication device is configured to be activated only after the start of movement of the piston and before actuation of the combusted gas evacuation valve.

9. The gas-powered tool of claim 5, wherein the fluidic communication device is pneumatically or mechanically controlled.

10. The gas-powered tool of claim 5, wherein the fluidic communication device comprises at least one conduit formed in a housing of the precombustion chamber and/or the combustion chamber.

11. The gas-powered tool of claim 5, wherein the fluidic communication device comprises at least one conduit formed in a support body for the flap.

12. The gas-powered tool claim 11, wherein the support body is elongated and is connected by at least one of its longitudinal ends to a mobile body of a valve.

13. The gas-powered tool of claim 11, wherein the support body is connected by each of its longitudinal ends to a mobile body of the combusted gas evacuation valve.

14. The gas-powered tool of claim 11, wherein the fluidic communication device comprises a valve that is moveable between a first position sealing the at least one conduit and a second position opening the at least one conduit.

15. The gas-powered tool of claim 14, which includes a biasing element that biases the valve to the first position.

16. The gas-powered tool of claim 15, wherein said valve comprises a ring arranged close to the flap, the biasing element biasing the ring against the flap.

17. The gas-powered tool of claim 15, wherein the valve is secured to a mobile body of the compressed gas evacuation valve.

18. The gas-powered tool of claim 14, wherein the valve is formed of one piece with the flap or fixed to the flap.

19. The gas-powered tool of claim 14, wherein the valve has a cylindrical tubular shape and comprises a substantially radial through-orifice able to be placed in fluidic communication with the at least one conduit.

20. A gas-powered tool comprising:
a working chamber;
a piston slidably mounted in the working chamber;
a precombustion chamber;
a combustion chamber between the precombustion chamber and the working chamber;
a flap separating the precombustion and combustion chambers, the flap being movable or deformable between a first position in which the precombustion and combustion chambers are in fluid communication and a second position in which the precombustion and combustion chambers are not in fluid communication;
at least one combusted gas evacuation valve; and
a fluidic communication device configured to establish fluid communication between the precombustion and combustion chambers and configured to be activated after the piston begins moving from a rest position to a working position and before actuation of the combusted gas evacuation valve to evacuate combusted gas from the combustion chamber,
wherein the fluidic communication device comprises at least one conduit formed in a support body for the flap, and wherein the fluidic communication device comprises a valve that is moveable between a first position sealing the at least one conduit and a second position opening the at least one conduit.

* * * * *